(12) United States Patent
Bunker et al.

(10) Patent No.: US 10,946,473 B2
(45) Date of Patent: Mar. 16, 2021

(54) ADDITIVE MANUFACTURING ON 3-D COMPONENTS

(71) Applicant: General Electric Company, Schenectady, NY (US)

(72) Inventors: Ronald Scott Bunker, West Chester, OH (US); William Thomas Carter, Galway, NY (US); Wayne Charles Hasz, Pownal, VT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 58 days.

(21) Appl. No.: 14/711,816

(22) Filed: May 14, 2015

(65) Prior Publication Data
US 2016/0332251 A1    Nov. 17, 2016

(51) Int. Cl.
| | | |
|---|---|---|
| *B23K 15/00* | (2006.01) | |
| *B23K 26/342* | (2014.01) | |
| *B22F 3/105* | (2006.01) | |
| *B22F 5/04* | (2006.01) | |

(52) U.S. Cl.
CPC ........ *B23K 15/0086* (2013.01); *B22F 3/1055* (2013.01); *B22F 5/04* (2013.01); *B23K 15/0006* (2013.01); *B23K 26/342* (2015.10); *Y02P 10/25* (2015.11)

(58) Field of Classification Search
CPC ............. B23K 15/0086; B23K 26/342; B23K 15/0006; B22F 3/1055; B22F 5/04; B22F 2998/10; B22F 2003/247; B22F 7/08; B22F 2999/00; B22F 5/10; B22F 7/06; B22F 7/062; B33Y 10/00; B33Y 80/00; B22C 7/02; B22C 9/043; B22C 9/10; B22C 9/22; B22D 25/02; F01D 5/186; F01D 5/187; F01D 5/20; F05D 2230/31; F05D 2260/204; Y02P 10/295
USPC .............. 219/76.12; 264/497, 113, 308, 112
See application file for complete search history.

(56) References Cited

U.S. PATENT DOCUMENTS

| | | | |
|---|---|---|---|
| 5,514,232 A | 5/1996 | Burns | |
| 5,957,006 A * | 9/1999 | Smith | ............... B22F 3/1055 156/62.2 |
| 5,997,251 A | 12/1999 | Lee | |
| 8,632,311 B2 | 1/2014 | Klasing et al. | |
| 2011/0241947 A1 | 10/2011 | Scott et al. | |

(Continued)

FOREIGN PATENT DOCUMENTS

| | | |
|---|---|---|
| CN | 104057083 A | 9/2014 |
| CN | 104364068 A | 2/2015 |

(Continued)

OTHER PUBLICATIONS

Extended European Search Report and Opinion issued in connection with corresponding EP Application No. 16168864.3 dated Sep. 7, 2016.

(Continued)

*Primary Examiner* — Dana Ross
*Assistant Examiner* — James F Sims, III
(74) *Attorney, Agent, or Firm* — Dority & Manning, P.A.

(57) ABSTRACT

A method of forming structure on a component includes: providing a component having a first surface; adhering powder to the first surface; and directing a beam from a directed energy source to fuse the powder in a pattern corresponding to a layer of the structure.

14 Claims, 8 Drawing Sheets

(56) References Cited

U.S. PATENT DOCUMENTS

| | | | |
|---|---|---|---|
| 2014/0079540 A1 | 3/2014 | Morris et al. | |
| 2015/0033559 A1 | 2/2015 | Bruck et al. | |
| 2015/0314530 A1* | 11/2015 | Rogren | B33Y 10/00 264/131 |
| 2016/0090848 A1* | 3/2016 | Engeli | C22C 19/057 219/76.12 |
| 2016/0144434 A1* | 5/2016 | Burd | B22F 3/1055 419/9 |
| 2016/0185009 A1* | 6/2016 | Keshavan | B28B 1/001 249/134 |

FOREIGN PATENT DOCUMENTS

| | | | |
|---|---|---|---|
| CN | 104511590 A | 4/2015 | |
| DE | 102005016940 A1 * | 10/2006 | ........... B22F 3/1055 |
| EP | 0 416 852 A2 | 3/1991 | |
| EP | 2 695 725 A1 | 2/2014 | |
| JP | H08-281807 A | 10/1996 | |
| JP | 2003-251701 A | 9/2003 | |
| JP | 2015-030883 A | 2/2015 | |
| WO | 2007/073205 A1 | 6/2007 | |
| WO | 2014/052323 A1 | 4/2014 | |
| WO | 2015/009444 A1 | 1/2015 | |

OTHER PUBLICATIONS

Office Action issued in connection with corresponding CA Application No. 2929756 dated Mar. 20, 2017.

Machine translation and Notification of Reasons for Refusal issued in connection with corresponding JP Application No. 2016-093538 dated Aug. 29, 2017.

Machine Translation and First Office Action and Search issued in connection with corresponding CN Application No. 201610314553.3 dated Nov. 3, 2017.

Third Office Action issued in connection with corresponding CN Application No. 201610314553.3 dated Jan. 4, 2019.

Office Action issued in connection with corresponding EP Application No. 16168864.3 dated Jan. 24, 2019.

Office Action issued in connection with corresponding CA Application No. 2929756 dated Nov. 8, 2018.

* cited by examiner

ADDITIVE MANUFACTURING ON 3-D COMPONENTS

BACKGROUND OF THE INVENTION

This invention relates generally to additive manufacturing methods, and more particularly to methods for forming structures on two- or three-dimensional substrates.

Additive manufacturing is a process in which material is built up layer-by-layer to form a component. Unlike casting processes, additive manufacturing is limited only by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing." Such terms are treated as synonyms for purposes of the present invention.

In the prior art, additive manufacturing may be carried out by laser melting of selected regions of layers of powder starting from a powder bed. The first layer is consolidated to a pattern, then powder is added, excess powder is removed (typically by scraping along a planar reference surface) to leave the next layer thickness, the powder is laser melted by pattern, then the steps are repeated. This is a planar process that builds an entire part with two-dimensional ("2-D") planar layers only.

While effective for manufacturing complete components, this process lacks the flexibility to build structures on substrates having non-planar or three-dimensional ("3-D") surfaces.

Accordingly, there remains a need for a process for additive manufacturing of structures on nonplanar surfaces.

BRIEF DESCRIPTION OF THE INVENTION

This need is addressed by the technology described herein, which provides a method for additive manufacturing of structures on an existing 2-D or 3-D substrate.

According to one aspect of the technology, a method of forming a structure on a component includes: providing a component having a first surface; adhering powder to the first surface; and directing a beam from a directed energy source to fuse the powder in a pattern corresponding to a layer of the structure.

According to another aspect of the technology, a method of forming a cooling channel on a component includes: providing a component having a first surface; adhering powder to the first surface; directing a beam from a directed energy source to fuse the powder in a predetermined pattern; and repeating in a cycle the steps of depositing and fusing to build up the structure in a layer-by layer fashion, wherein the structure includes spaced-apart walls which define an open channel therebetween.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
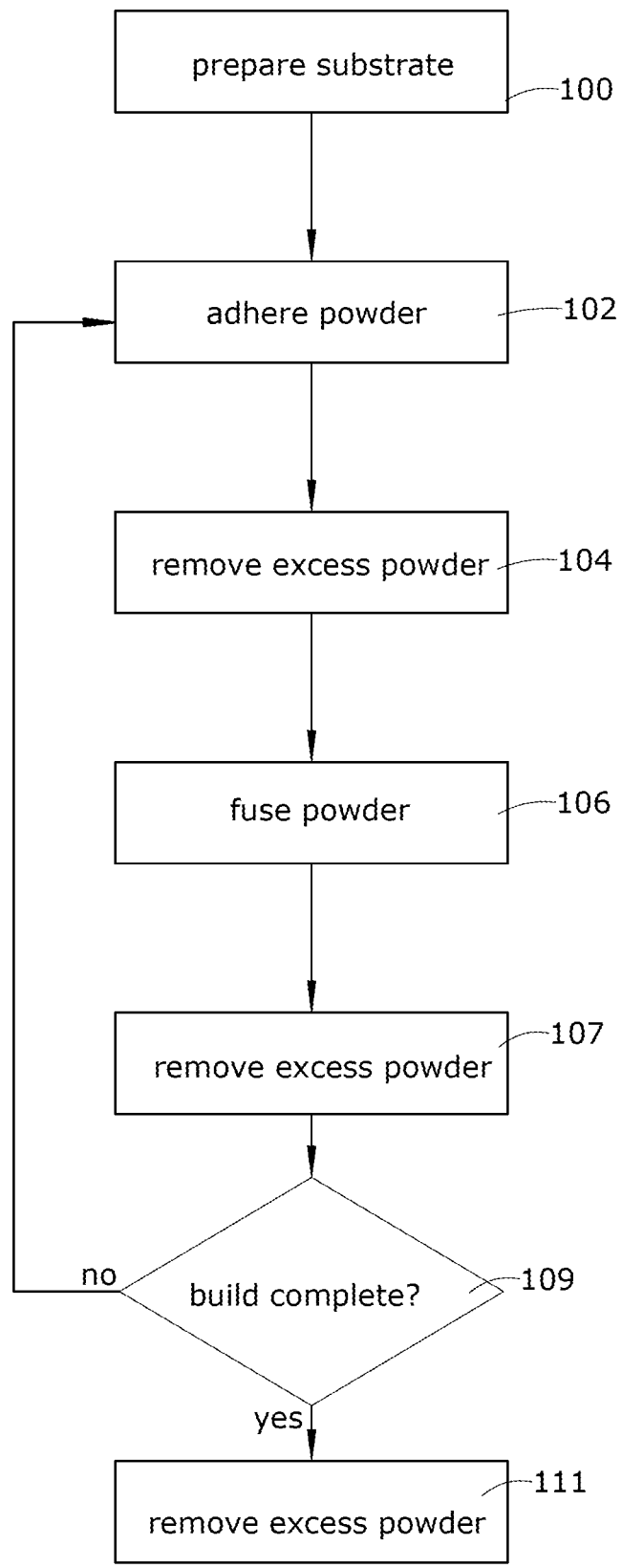
FIG. 1 is a block diagram of an additive manufacturing process.

Referring to the drawings wherein identical reference numerals denote the same elements throughout the various views, FIG. 1 is a flowchart showing the steps in an additive manufacturing process. The process begins with an existing part surface. The term "part" refers both to an otherwise-complete component as well as a part in an uncompleted state, such as a rough casting, blank, preform, or part manufactured by an additive manufacturing process. The surface is appropriately prepared (block 100) as required to accept bonding of a powdered material thereto. For example, contaminants may be removed and/or the surface roughened by solvents, fluoride ion cleaning, grit blasting, etc.

Next, a powder is adhered to the surface, block 102. The powder may be any suitable material for additive manufacturing. For example, the powder may be of metallic, polymeric, organic, or ceramic composition.

As used herein, the term "adhere" refers to any method that causes a layer to adhere to the surface with sufficient bond strength so as to remain in place during a subsequent powder fusion process. "Adhering" implies that the powder has a bond or connection beyond simply resting in place under its own weight, as would be the case with a conventional powder-bed machine. For example, the surface may be coated with an adhesive product, which may be applied by methods such as dipping or spraying. One non-limiting example of a suitable low-cost adhesive is Repositionable 75 Spray Adhesive available from 3M Company, St. Paul, Minn. 55144 US. Alternatively, powder could be adhered by other methods such as electrostatic attraction to the part surface, or by magnetizing the powder (if the part is ferrous). As used herein, the term "layer" refers to an incremental addition of mass and does not require that the layer be planar, or cover a specific area or have a specific thickness.

The powder may be applied by dropping or spraying the powder over the surface, or by dipping the part in powder. Powder application may optionally be followed by brushing, scraping, blowing, or shaking as required to remove excess powder (block 104), for example to obtain a uniform layer. It is noted that the powder application process does not require a conventional powder bed or planar work surface, and the part may be supported by any desired means, such as a simple worktable, clamp, or fixture.

Once the powder is adhered, a directed energy source (such as a laser or electron beam) is used to melt a layer of the structure being built, bock 106. The directed energy source emits a beam and a beam steering apparatus is used to steer the beam over the exposed powder surface in an appropriate pattern. The exposed layer of the powder is heated by the beam to a temperature allowing it to melt, flow, and consolidate. This step may be referred to as fusing the powder.

The fusing step may be followed by removing any unfused powder (e.g. by brushing, scraping, blowing, or shaking) as required, block 107. This step is optional, meaning it may or may not be required or desired for a particular application.

This cycle of adhering powder, removing excess powder, and then directed energy melting the powder is repeated until the entire component is complete (block 109).

Figure 2:
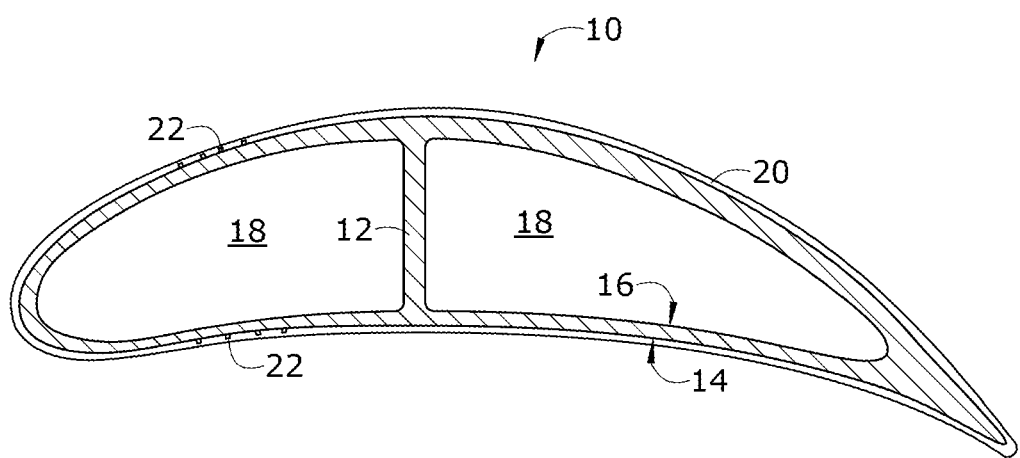
FIG. 2 is a schematic cross-sectional view of an exemplary turbine component.

The general process described above may be used to form any type of additive structure desired. The process is particularly useful for forming cooling structures on gas turbine engine hot section components. FIG. 2 shows an example of a hot section component 10 having an airfoil configuration, representative of a high pressure turbine blade or nozzle. As indicated, the component 10 comprises a substrate 12 with an outer surface 14 and an inner surface 16. For example, the substrate 12 may be a casting. The inner surface 16 of the substrate 12 may define at least one hollow interior space or cavity 18, in a non-limiting example for the supply of coolant. An additive structure 20 is built upon and surrounds at least a part of the outer surface 14. The component 10 incorporates a number of surface cooling channels 22, also referred to as micro-channels. The surface cooling channels 22 may be formed in the substrate 12, partially in the substrate 12 and the additive structure 20, or completely in the additive structure 20.

The component 10 may be made from a material such as a nickel- or cobalt-based alloy having good high-temperature creep resistance, known conventionally as "superalloys."

The outer surface 14 of the illustrated component 10 is non-planar or "a 3-D surface". Stated another way, it is curved about at least one axis. The process described herein is equally applicable to 2-D and 3-D substrates.

FIGS. 3 through 10 illustrate sequential steps in the process of manufacturing the additive structure 20, using the process described above, Initially, the substrate 12 is provided and the outer surface 14 is prepared as required.

Figure 3:
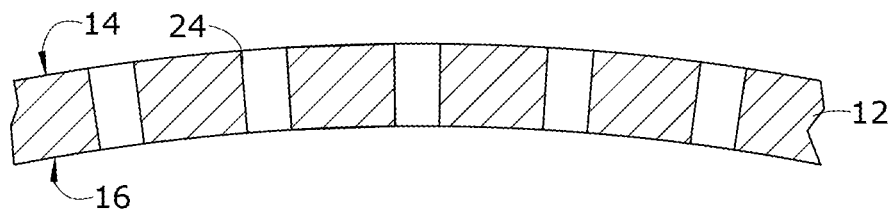
FIG. 3 is a schematic view of a portion of the turbine component of FIG. 2, showing cooling holes being formed in a substrate.
Figure 4:
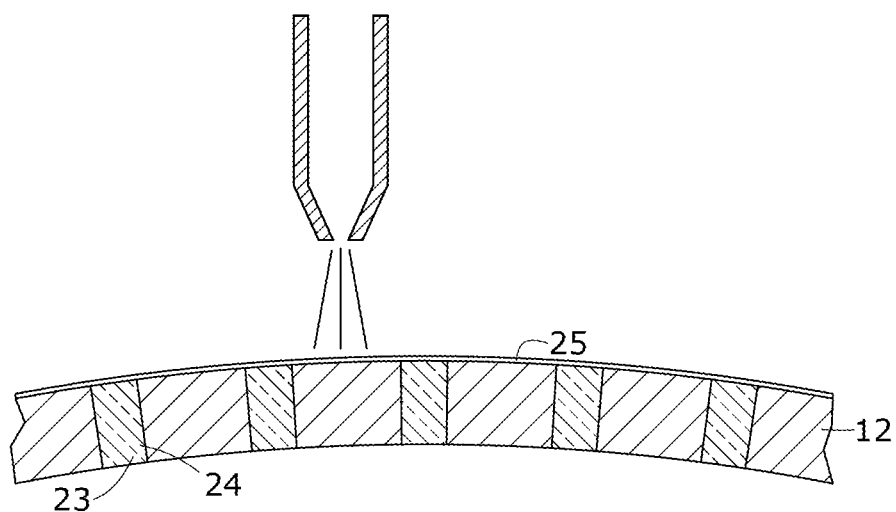
FIG. 4 is a schematic view of a portion of the turbine component of FIG. 2, showing adhesive being applied.

Coolant feed holes 24 may be formed through the wall of the substrate 12 as needed, as shown in FIG. 3. The coolant feed holes 24 may be plugged or covered with an appropriate material (e.g. wax, polymer tape, etc.) to prevent powder from entering them during subsequent steps. Plugs 23 are shown as an example. If the surface cooling channels 22 are to be made partially in the substrate 12, then these would already be incorporated therein, as part of the casting or performed by a conventional machining process. In the example of FIGS. 3-10 the surface cooling channels 22 are formed entirely within the additive structure 20.

Figure 5:
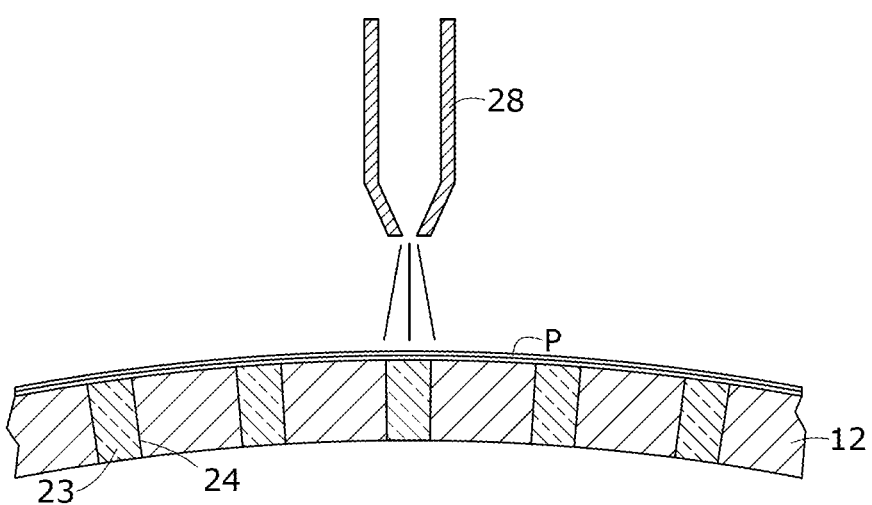
FIG. 5 is a schematic view of a portion of the turbine component of FIG. 2, showing powder being applied.

Powder P is then adhered to the outer surface 14. In the illustrated example the powder P is adhered by first applying an adhesive 25 to the outer surface 14 (FIG. 4), for example by dipping or spraying, and then applying the powder P over the adhesive 25, for example by dropping or spraying powder P from a nozzle 28. Excess powder P may be removed by mechanically brushing the surface, blowing with an air jet, or agitating the substrate 12. FIG. 5 shows the substrate 12 after application of a layer of powder P.

In this example, the powder P may be made from a material such as a nickel- or cobalt-based alloy having good high-temperature creep resistance, known conventionally as "superalloys." As a non-limiting example, the thickness of the powder layer may be about 10 micrometers (0.0004 in.).

Figure 6:
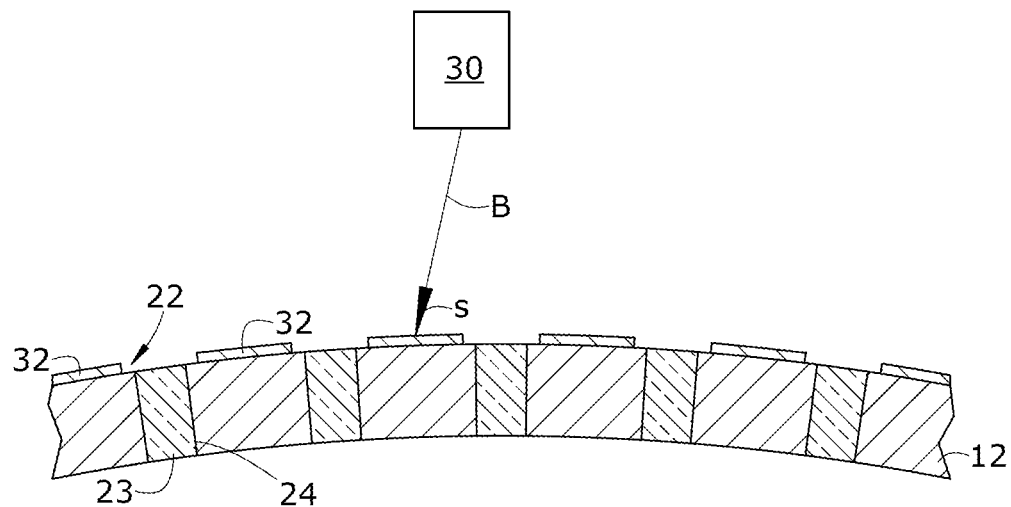
FIG. 6 is a schematic view of a portion of the turbine component of FIG. 2, showing powder being fused.

A directed energy source 30 (such as a laser or electron beam gun) is used to melt the layer of powder P in a pre-programmed pattern representing a desired structure, as shown in FIG. 6. The directed energy source 30 emits a beam "B" and a beam steering apparatus is used to steer the focal spot "S" of the beam B over the exposed powder surface in an appropriate pattern. The exposed layer of the powder P is heated by the beam B to a temperature allowing it to melt, flow, and consolidate. FIG. 6 shows a beam B being used to form the first layers of a plurality of walls 32. The spaces between adjacent walls 32 define the surface cooling channels 22. Each surface cooling channel 22 communicates with one of the coolant feed holes 24. It is noted that the surface cooling channels 22 can be of any shape, for example the bottom may be a shape other than flat, the side walls may be angled inwards or outwards, etc.

Figure 7:
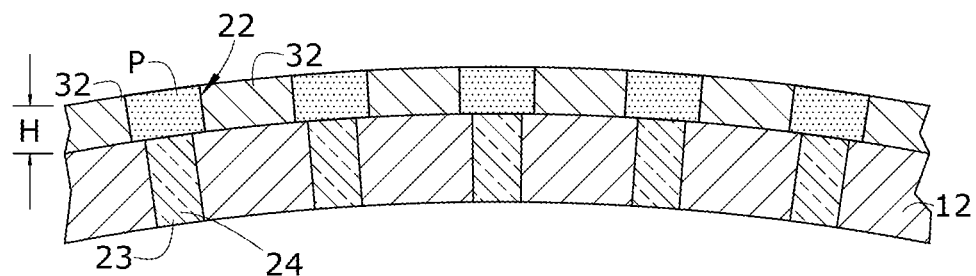
FIG. 7 is a schematic view of a portion of the turbine component of FIG. 2, showing a later stage of construction.

The steps of adhering powder and fusing the powder are repeated to build up a structure in layer-by-layer fashion. FIG. 7 shows a subsequent step after many layers have been applied, with the surface cooling channels 22 having reached their full radial height "H". In this example, unfused powder P is left in the surface cooling channels 22 to serve as a support for a subsequent cover. It is noted that the un-fused powder P shown in the surface cooling channels 22, as well as the plugs 23, may not be necessary if a structure will not be built over the coolant feed holes 24 or the surface cooling channels 22, or if a structure will be built over the coolant feed holes 24 using an alternative method as described below. In such circumstances, any un-fused powder P may be cleaned out in each cycle of the steps of adhering and fusing powder.

Figure 8:
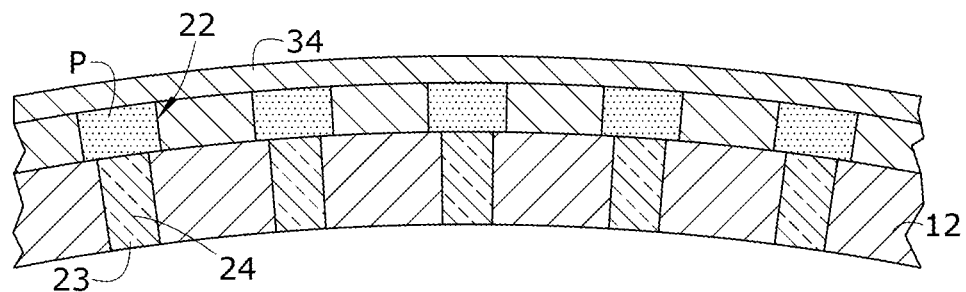
FIG. 8 is a schematic view of a portion of the turbine component of FIG. 2, showing an additive structure with un-fused powder therein.
Figure 9:
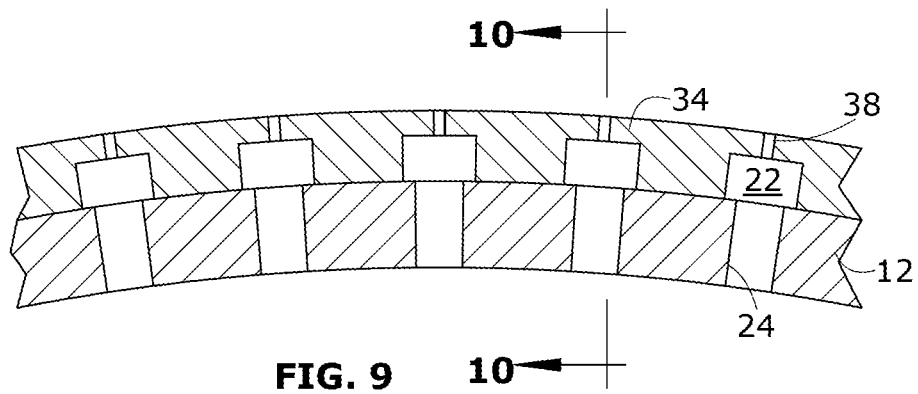
FIG. 9 is a schematic view of a portion of the turbine component of FIG. 2, showing a completed additive structure.
Figure 10:
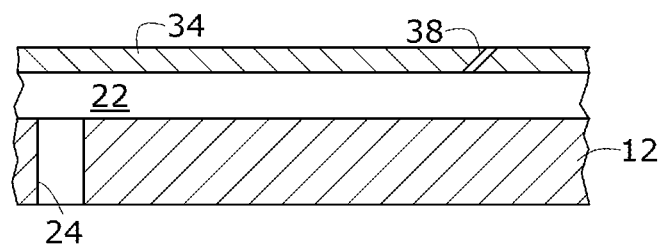
FIG. 10 is a view taken along lines 10-10 of FIG. 9.

A cover may be formed over the surface cooling channels 22 by continuing the additive process described above. FIG. 8 shows a cover 34 formed over the surface cooling channels 22. The cover 34 defines exterior surface of the component 10. Subsequent to forming the cover 34, the un-fused powder P remaining in the surface cooling channels 22 may be removed (see block 111 in FIG. 1), for example by air jet, vacuum extraction, chemical removal, fluid flush, and/or vibration of the component 10, leaving the completed surface cooling channels 22 as seen in FIGS. 9 and 10.

The cover 34 may include a plurality of exit film holes 38. It should be noted that although the exit film holes 38 are shown in FIG. 9 as being round, and at an angle relative to the exterior surface as shown in FIG. 10, these are non-limiting examples. The film holes may also be non-circular shaped holes and configured substantially perpendicular to, or at any angular instance, relative to the coating surface, and may optionally have variously shaped inlet and exits, for example diffuser exits of various types are known in the art. In addition, in an embodiment the exit film holes 38 may not be formed as discrete features that match up one film hole per surface cooling channel 22. In such embodiment, one or m film trenches that connect more than one surface cooling channel 22 exit together into a continuous exit feature may be formed. The exit film holes 38 or similar apertures may be formed as part of the additive process, or machined afterwards by a conventional method as known in the art.

As an alternative to the additive covering method described above, the surface cooling channels 22 may be completed up to the open channel stage shown in FIG. 7, and then a cover may be made using prior art methods.

Figure 11:
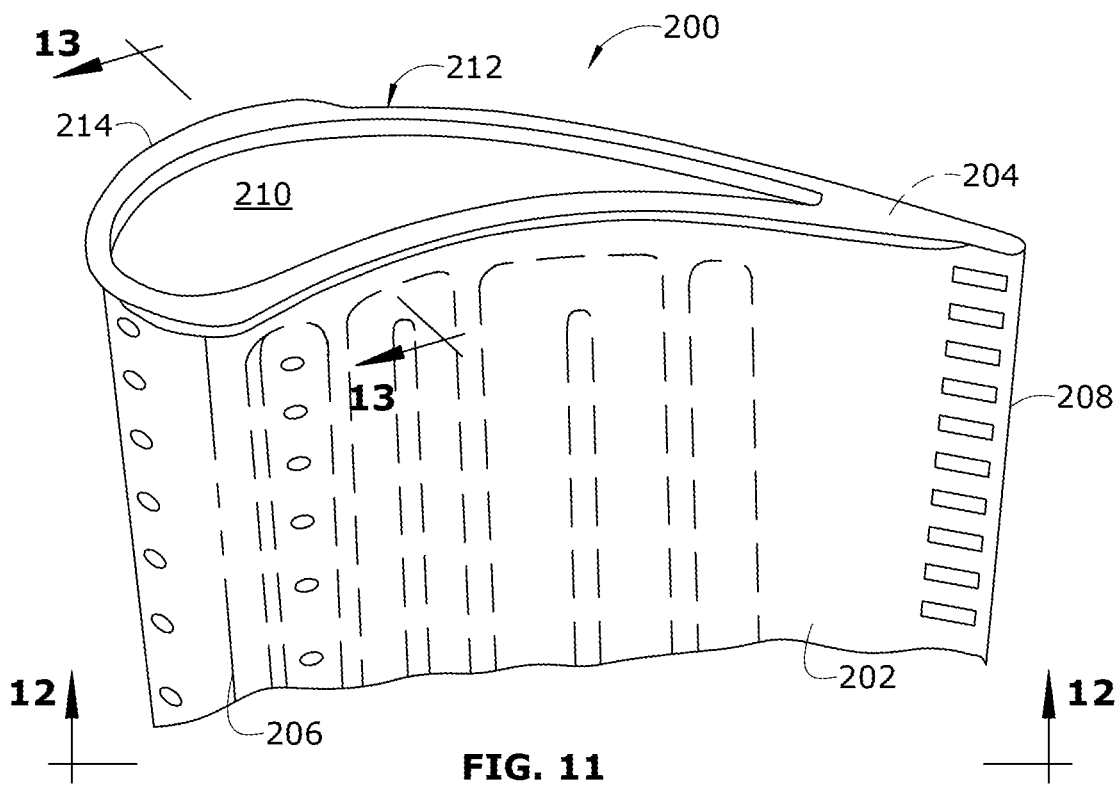
FIG. 11 is a perspective view of a portion of a gas turbine engine airfoil.
Figure 12:
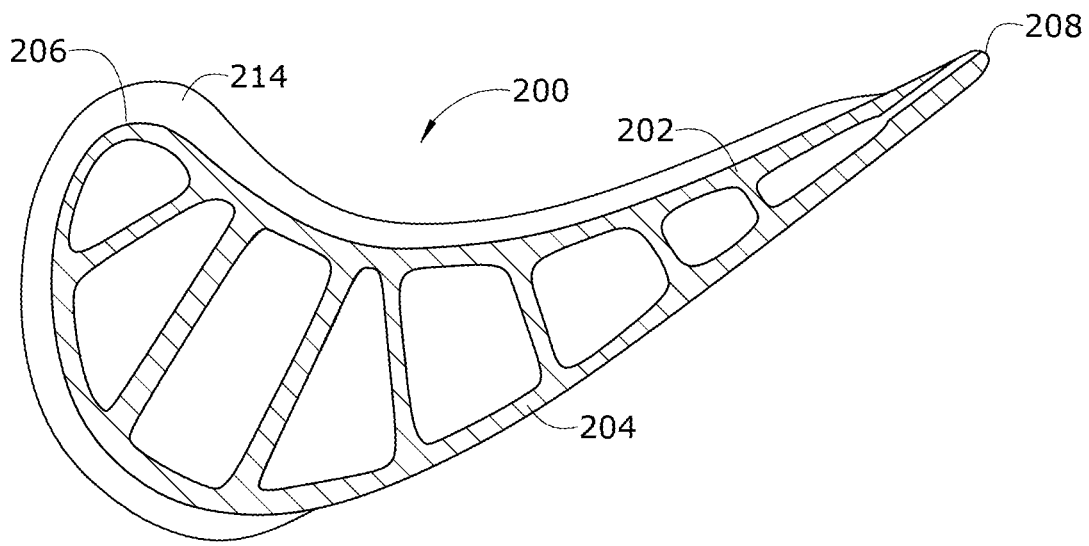
FIG. 12 is a view taken along lines 12-12 of FIG. 11.
Figure 13:
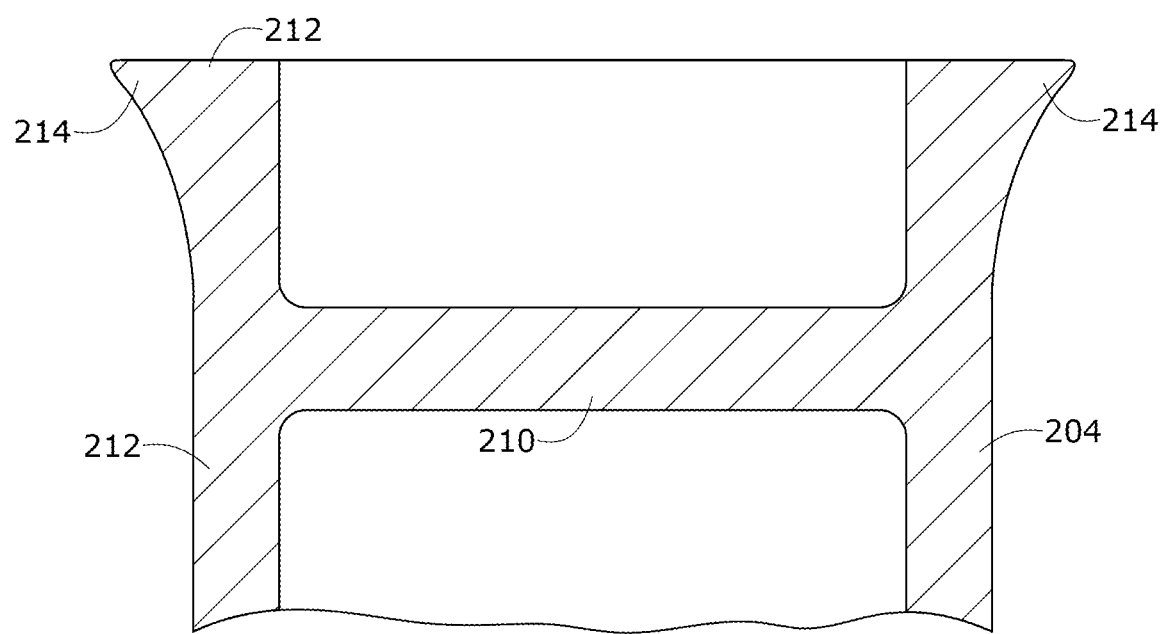
FIG. 13 is a view taken along lines 13-13 of FIG. 11.

As noted above, the additive manufacturing process does not require that the layers be planar. To more clearly illustrate this point, FIGS. 11-13 illustrate a further example of a component built up using arbitrary-shaped layers, more specifically a tip portion of a high pressure turbine airfoil 200. The airfoil 200 includes opposed pressure and suction sidewalls 202, 204 respectively, extending between a leading edge 206 and a trailing edge 208. A tip cap 210 closes off the distal end of the airfoil 200. The airfoil 200 also includes a "squealer tip" 212 comprising a wall extending radially outward from the tip cap 210. The squealer tip 210 incorporates a flared portion 214 that extends laterally outward from the outer surfaces of the pressure and suction sidewalls 202, 204 and extends around a portion of the airfoil's periphery.

Figure 14:
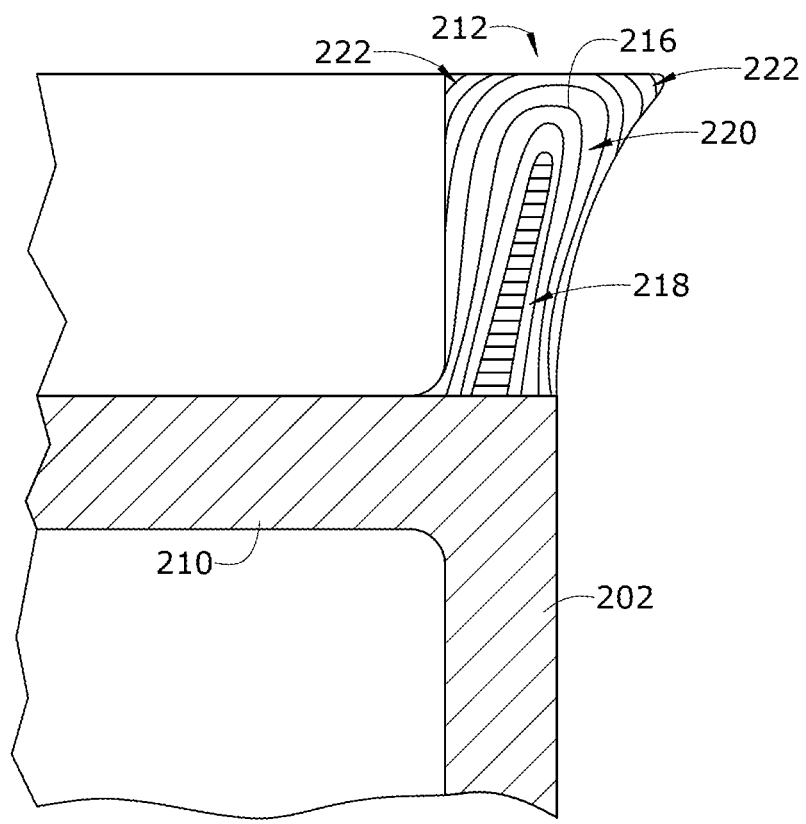
FIG. 14 is a sectional view of a portion of the airfoil of FIG. 11, showing the layers in an additive-manufactured portion thereof.
Figure 15:
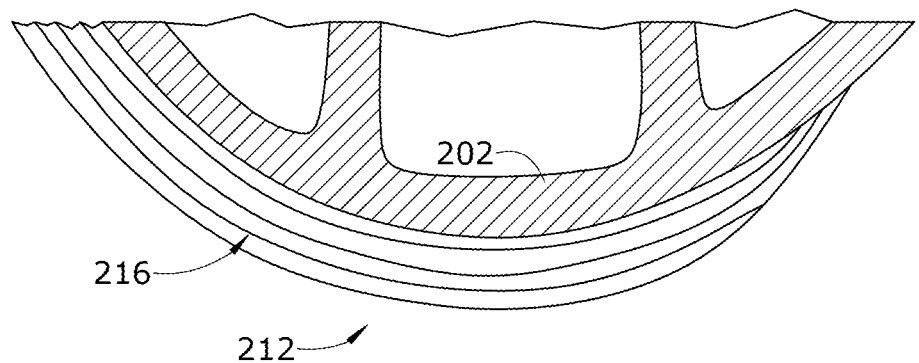
FIG. 15 is another sectional view of the additive-manufactured portion shown in FIG. 14.

The squealer tip 212 is an example of a structure that may be formed using the principles described herein. Starting with an airfoil substrate comprising the tip cap 210 and pressure and suction sidewalls 202, 204, the squealer tip 212 may be built up in a series of layers using the repeated steps of adhering powder and fusing the powder described above. In FIGS. 14 and 15, lines 216 represent generally the layers. (The thickness of the layers 216 is greatly exaggerated for illustrative purposes). It can be clearly seen that the layers 216 may take on any shape or size needed for efficient construction with a minimum of powder and processing time. For example, a core 218 of the squealer tip 212 includes a plurality of planar layers, while an intermediate portion 220 includes a plurality of three-dimensional enveloping layers, and distal portions 222 include three-dimensional layers extending over only a portion of the surface area of the squealer tip 212.

The process described herein has several advantages over the prior art. The additive manufacturing process is much simpler and requires far fewer process steps to produce a component as compared to conventional investment casting. The specific method described herein does not require the use of large powder beds and enables the building of additive structures onto existing 3-D components at low cost.

The foregoing has described an apparatus and method for additive manufacturing of structures on 2-D and 3-D components. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A method of forming a structure on a component, comprising:
   providing the component having a first surface;
   applying an adhesive to the first surface;
   applying a powder to the adhesive and adhering some of the powder to the first surface to form adhered powder such that any powder not adhered to the first surface is excess powder;
   removing the excess powder;
   directing a beam from a directed energy source to fuse the adhered powder in a pattern corresponding to a layer of the structure, wherein a cycle of adhering the powder to form adhered powder, removing excess powder, and directing the beam to fuse the adhered powder is repeated to build up the structure in a layer-by-layer fashion until the entire component is complete; and
   wherein the steps of applying an adhesive, applying a powder, removing excess powder, and directing a beam from a directed energy source occur without the use of any powder bed.

2. The method of claim 1, wherein repeating the cycle of adhering and fusing results in the component including both fused and un-fused powder, the method further comprising removing the un-fused powder.

3. The method of claim 1, wherein the first surface is non-planar.

4. The method of claim 1, wherein the component comprises a metal alloy.

5. The method of claim 1, wherein the powder comprises a metal alloy.

6. The method of claim 1, further comprising forming at least one coolant supply hole in the component communicating with the at least one open channel.

7. The method of claim 1, further comprising removing excess powder after adhering the powder.

8. A method of forming a cooling channel on a component, comprising:
   providing a component having a first surface;
   applying an adhesive to the first surface;
   applying a powder to the adhesive and adhering some of the powder to the first surface;
   removing excess powder;
   directing a beam from a directed energy source to fuse the powder in a predetermined pattern; and
   repeating in a cycle the steps of adhering, removing, and fusing to build up the cooling channel in a layer-by-layer fashion, wherein the cooling channel includes spaced-apart walls which define at least one open channel therebetween; and
   wherein the steps of applying an adhesive, applying a powder, removing excess powder, and directing a beam from a directed energy source occur without the use of any powder bed.

9. The method of claim 8, further comprising forming a cover spanning the at least one open channel.

10. The method of claim 9, further comprising:
    leaving un-fused powder in the at least one open channel;
    forming the cover; and
    removing the un-fused powder.

11. The method of claim 10, further comprising forming at least one exit film hole through the cover communicating with the channel.

12. The method of claim 8, wherein the first surface is non-planar.

13. The method of claim 8, wherein the component comprises a metal alloy.

14. The method of claim 8, wherein the powder comprises a metal alloy.

\* \* \* \* \*